United States Patent
Kowal et al.

(12)

(10) Patent No.: US 6,690,786 B1
(45) Date of Patent: Feb. 10, 2004

(54) TELEPHONE SYSTEM HAVING MULTIPLE ADMINISTRATORS OF SWITCHING SYSTEM RESOURCES

(75) Inventors: James Allen Kowal, Naperville, IL (US); Mary Rita Otto, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/474,871

(22) Filed: Dec. 29, 1999

(51) Int. Cl.[7] .............................................. H04M 7/00
(52) U.S. Cl. .............. 379/221.01; 379/242; 379/221.06
(58) Field of Search ............................ 379/219, 221.01, 379/221.02, 221.03, 221.07, 242, 246, 221.06

(56) References Cited

U.S. PATENT DOCUMENTS

| | | | |
|---|---|---|---|
| 5,274,644 A | * 12/1993 | Berger et al. | 370/95.1 |
| 5,596,576 A | * 1/1997 | Milito | 370/450 |
| 5,781,624 A | * 7/1998 | Mitra et al. | 379/244 |

* cited by examiner

Primary Examiner—Creighton Smith (57) ABSTRACT

A system for allowing a plurality of administrators to control switching system resources in a telephone system. A switching system is communicatively connected to a server computer. The server computer maintains databases that store the resources that a plurality administrators are allowed to access and the functions that each administrator is allowed to perform. When the server computer receives a request from an administrator for an administrative function to be performed by the switching system, the software executed by the server computer accesses the database and determines if the administrator is allowed to perform the requested function and if the resources are available to administrator. If the administrator has made a valid request the server computer generates a command and transmits the command to the switching system that performs the function requested in the command. The server computer may also maintain a database that maintains a pool of unused resources. These resources may then be allocated to administrators upon a demand basis. Any unfulfilled request can then be logged and used to allocate resources in the future or to add additional resources to the system.

37 Claims, 5 Drawing Sheets

| ADMINISTRATION ID | PASSWORD | PARTITIONED RESOURCE | DEDICATED RESOURCES | UNSUSED RESOURCES | FUNCTIONS |
|---|---|---|---|---|---|
|  |  |  |  |  |  |
|  |  |  |  |  |  |
| ... | ... | ... | ... | ... | ... |
|  |  |  |  |  |  |
|  |  |  |  |  |  |

FIG. 8

| RESOURCE ID | SWITCHING SYSTEM | ADMINISTRATOR | DEDICATED RESOURCES | UNSUSED RESOURCES | ALLOCATED |
|---|---|---|---|---|---|
|  |  |  |  |  |  |
|  |  |  |  |  |  |
| ... | ... | ... | ... | ... | ... |
|  |  |  |  |  |  |

FIG. 9

| | SWITCHING SYSTEM IDENTIFICATION | TYPE OF SWITCH SYSTEM | RESOURCES ON SWITCH | RESOURCES IN UNUSED POOL ON SWITCH |
|---|---|---|---|---|
| | | | | |
| | | | | |
| | | | | |
| ⋮ | ⋮ | ⋮ | ⋮ | ⋮ |
| | | | | |
| | | | | |

TELEPHONE SYSTEM HAVING MULTIPLE ADMINISTRATORS OF SWITCHING SYSTEM RESOURCES

FIELD OF THE INVENTION

This invention relates to a telephone system having a plurality of administrators of switching system resources. More particularly, this invention relates to a computer system network connected to a switching system via a server to provide access to swithing system resources by the administrators. Still more particularly, this invention relates to software applications and databases maintained by the server to partition switching system resources between the administrators and to prevent unauthorized access of the switching system resources. This invention also relates, to software applications executed by the server computer-that allow unused switching system resources to be dynamically allocated to administrators to meet administrator demands for additional resources- during peak calling times.

PROBLEM

It is a problem to allow multiple administrators to control switching system resources. For the purposes of the present discussion, switching system resources include telephone lines, trunks, and other systems of a switching system used to provide telephone service to subscribers connected to the switching system. One problem with allowing multiple administrators to control switching system resources is the ability to prevent an administrator from controlling resources that are under the control of other administrators. Switching systems typically do not provide a system for partitioning the resources to prevent administrators from controlling resources in the switching system that are not partitioned to the administrator.

The lack of an ability to allow multiple administrators to control resources has become a particular problem as more administrative accesses of switching systems resources are needed to provide telephone service in today's society. One reason that more administrative accesses are needed is computer telephony which is the transmitting of digital computer data over the telephone network. In computer telephone, administrative accesses increase because computer telephony requires that a subscriber have an ability to start, stop, and restart links into the switching system. Each of these functions requires an administrative access of the switching system. In current switching systems, an administrative access can only be executed by the owner of the switching system. This places a great administrative burden on the owner of the switching system to provide these accesses for all of the subscribers connected to the switching system.

It is common for an owner of the switching system to sell or lease resources in the switching system to service resellers, who in turn, sell or lease the resources to subscribers. However, there is currently no effective method of passing the burden of providing the administrative accesses onto the service resellers. The owner of the switching system must still provide all of the administrative accesses. Owners of switching systems desire a process for passing the burden of administrative accesses along to the service resellers when resources are sold or leased to the resellers. As stated above, one problem with allowing the service resellers to provide administrative accesses is the ability to limit the access of a service provider to only the resources owned by the service reseller.

It is also a problem that service resellers must be given enough resources to satisfy the demands of the subscribers during peak calling times. Peak calling times are periods when a subscriber or service reseller need extra resources to handle an increase in the number of calls to a subscriber or subscribers. In order to meet the resource demands during a peak calling period, a service reseller will typically buy a surplus of resources. All resources controlled by a service reseller may not be used on a regular basis. A certain percentage of resources may only be used during peak calling times for the subscribers of the service reseller. The peak calling times may be different for the subscribers and different resellers. Resources could be reused by different resellers if there were a method for dynamically allocating the resources. It is desirable to develop a system for allocating excess resources during period of low demands by a service resellers to make more efficient use of the switching system resources.

There is a need for a system that would allow the owner of a switching system to allow each service reseller to configure the resources controlled by the reseller on the switching system and to shift the burden of administrative accesses to the service resellers. There is also a need for efficient allocation of switching system resources to meet the demands of subscribers.

SOLUTION

The above and other problems are solved and an advance in the art is made by providing a system for allowing multiple administrators to control resources of a switching system. One advantage of allowing multiple administrators to control the resources is that the burden of doing the Operation, Administrative, and Maintenance functions (OA&M functions) on the switching system can be transferred from the owner of the switching systems to each administrator that control the resources. A second advantage is that each administrator may subdivide the resources controlled by the administrator to allow sub-administrators to control their allocated resources. A third advantage is that resources not being used by an administrator may be placed into a common pool of unused resources and provided to other administrators on a demand basis. A fourth advantage of the present invention is that one server computer can be used to control multiple switching systems and the actual location of resources on different switching systems could be hidden from an administrator controlling the resources.

In order to allow multiple administrators access to switching systems in a telephone system, a server computer is communicatively connected to a controler of each switching system. Software applications executed by the server computer allow the server computer to transmit data in a form that can be understood by the controller of the switching system. Since there are several different types of switching systems, the server computer must have a different software application for communicating with each different type of switching system connected to the server.

The server computer is also connected to a plurality of work station computers. Administrators use the work station computers to transmit OA&M commands to the server computer. When the server computer receives an OA&M command from an administrator via a work station computer, software applications executed by the server computer read an administrator data record from an administrator database. The software applications then compare a password in the command received from the administrator with a password in the administrator data record to determine if the command is from the identified administrator. The software applications also use the administrator data record to determine if the administrator is authorized to perform the requested command and to determine which resources are partitioned to the administrator. This prevents the administrator from performing OA&M commands on resources that are not partitioned to the administrator.

Since the server computer is maintaining a record of all the resources in the switching systems, it is also possible to maintain a common pool of unused resources. The common pool of unused resources contains the resources in each administrator partition that are not frequently used by the administrator for providing telephone service to subscribers. The resources in the pool can then be allocated to other administrators on a demand basis to meet resource demands during peak demand times for a particular business or application. For example, an administrator may normally use five trunks to provide phone service to subscriber lines controlled by the administrator. However, the administrator may need 10 trunks during a peak calling time in order to provide telephone service to all of the administrators's subscribers. It is possible to allow the administrator to request the additional trunks from the common pool of unused resources. This allocates the resources of other administrators whose subscribers have different peak calling times and allows for a more efficient use of switching system resources to assure that administrators can meet the resource demand of their subscribers.

In order to perform the functions of allowing multiple administrators to control switching system resources and maintaining a pool of unused resources, the server computer must maintain an administrator database, a resource database, and a switching system database. The administrator database includes administrator data records that include the resources partitioned to an administrator, the OA&M functions that the administrator is allowed to perform, and the resources in the partition that can be included in the pool of unused resources. The administrator database is used by software applications executed by the server computer to verify messages from administrators and to prevent administrators from performing OA&M functions on resources that are not partitioned to the administrator. In order to allocate resources from the common pool of unused resources, the administrator database is also read to determine if the administrator currently has unused resources in the pool that can be used to satisfy the request.

The resource database is a database that stores data records for each resource. Each data record in the resource database includes a resource identity, the switching system containing the resource, a field indicating that the resource is a resource dedicated to an administrator, a field indicating that the resource is in the pool of unused resources, and a field indicating whether a resource is currently allocated to an administrator from the pool of unused resources. The records in the resource database are used by software applications executed by the server computer to determine the availability of a resource for use and to determine Which switching system contains the resource in order to generate an OA&M function command for that switching system.

The switching system database is a database that stores information about every switching system connected to a server. The switching system database is used by the software applications executed by the server to determine the type of switching system containing a resource and whether a switching system has resources available to satisfy a request for additional resources from an administrator. Each record in the switching system database includes the identification of the switching system, the type of switching system, the resources contained in the switching system and the resources in available in the unused pool of the switching system.

DETAILED DESCRIPTION

Figure 1:
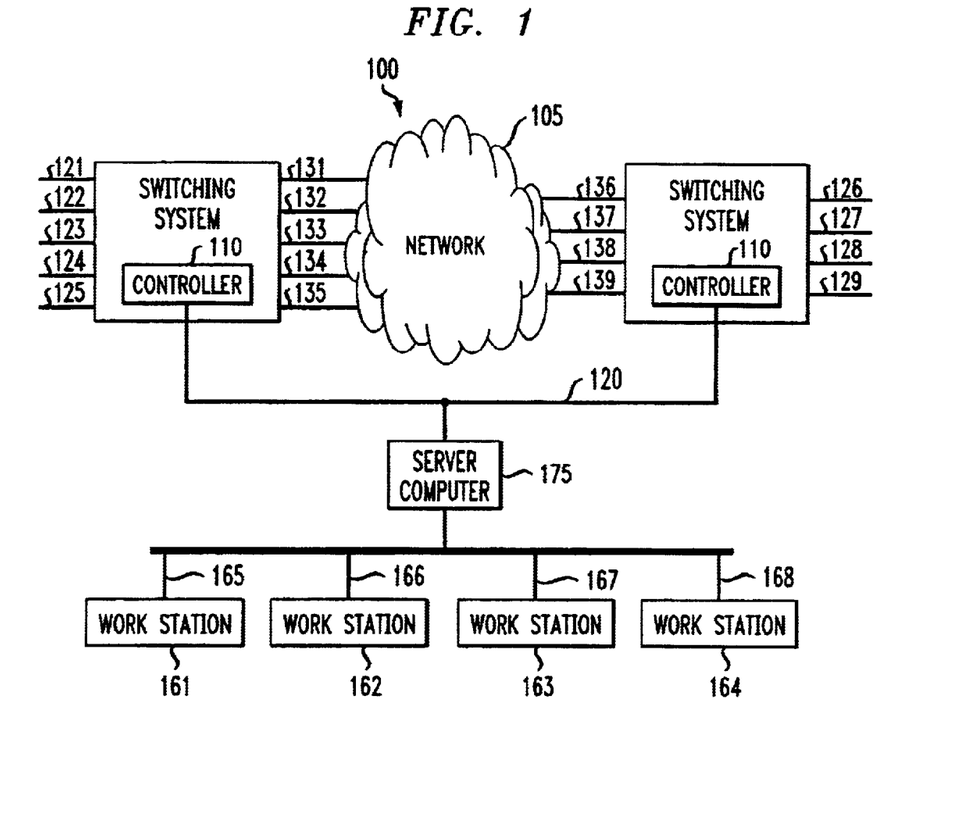
FIG. 1 illustrates a block diagram of a telephone system having multiple administrators of switching system resources.

Diagram of a Telephone System—FIG. 1

FIG. 1 illustrates telephone system 100 which allows multiple administrators to perform OA&M functions on switching systems 101–102. Switching systems 101–102 are standard switching systems, such as a 5ESS® central office switching system produced by AT&T. Switching systems 101–102 each have n lines 121–129 for providing connections to subscriber telephone stations(not shown). The n trunks 131–139 connect switching systems 101–102 to other switching systems in telephone network 105. The n trunks 131–139 and n loops 121–129 connected to a switching system 101–102 as well as other devices and systems in the switching systems are hereafter referred to as resources. Each switching system 101–102 has a controller 110 which is a processing system that controls the operation of the switching system. An exemplary processing system is illustrated in FIG. 6.

In order to allow multiple administrators to control switching resources, controllers 110 of switching systems 101–102 are connected to server computer 175 via communications path 120. Data can be transferred between controllers 110 and server computer 175 over the communications path 120. This allows server computer 175 to transmit commands to controllers 110 for performing OA&M functions requested administrators. Server computer 175 is a computer that has a processing system such as the processing unit illustrated in FIG. 6.

A plurality of work station computers 161–164 are also connected to server computer 175 via paths 165–169. Work station computers 161–164 are computers having standard processing systems such as the processing system illustrated in FIG. 6. Administrators input OA&M commands into work station computers 161–164 which generate messages which are transmitted to server computer 175.

Figure 6:
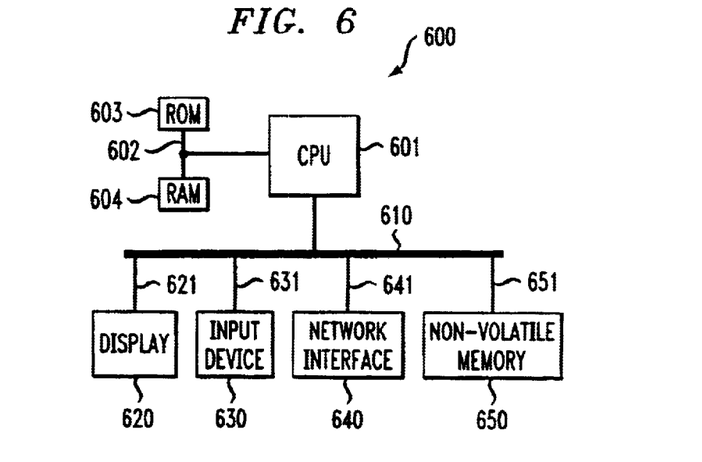
FIG. 6 illustrates a block diagram of a processing unit.

Block Diagram of a Processing Unit—FIG. 6

In order to allow multiple administrators to control resources in the switching systems 101–102, the present invention requires a plurality of processing systems including server computer 175, work station computers 161–164 and controllers 110 to be communicatively linked to perform the various operations required to provide security for telephone network 100 while allowing multiple administrators to each control the resources of the switching systems 101–102 partitioned to the administrators. FIG. 6 illustrates a standard processing system 600 that is representative of each of these processing systems.

Processing system 600 has a central processing unit (CPU) 601 which executes instructions read from a memory to perform applications that comprise the operations of processing system 600. CPU 601 is connected to a memory bus 602. Memory bus 602 allows CPU 601 to access Read Only Memory (ROM) 602 and Random Access Memory 603. ROM 602 is a memory that stores instructions for performing the basic operative tasks of processing system 600. RAM 603 is a memory that stores the instructions and data needed to execute applications that are performed by processing system 600.

I/O bus 610 connects CPU 601 to a plurality of peripheral devices. CPU 601 receives and transmits data to the peripheral devices via I/O bus 610. The peripheral devices connected to I/O bus 610 can include, but are not limited to, display 620, input device 630, network interface 640, and non-volatile memory 650. Display 620 is connected to I/O bus 610 by path 621 and includes a video driver and connected monitor for displaying information to a user. Input device 630 is connected to I/O bus 610 via path 631 and is a keyboard, mouse and/or other device attached to an appropriate driver for receiving input data from a user. Network interface 640 is connected to I/O bus 610 via path 641. Network interface 640 is a device, such as a modem or Ethernet device driver, that allows processing system 600 to communicate with a second processing system. Non-volatile memory 650 is a device, such as a disk drive, connected to I/O bus 610 via path 651 and which can read and write data to a disk or other storage media to store the data for future use.

Figure 7:
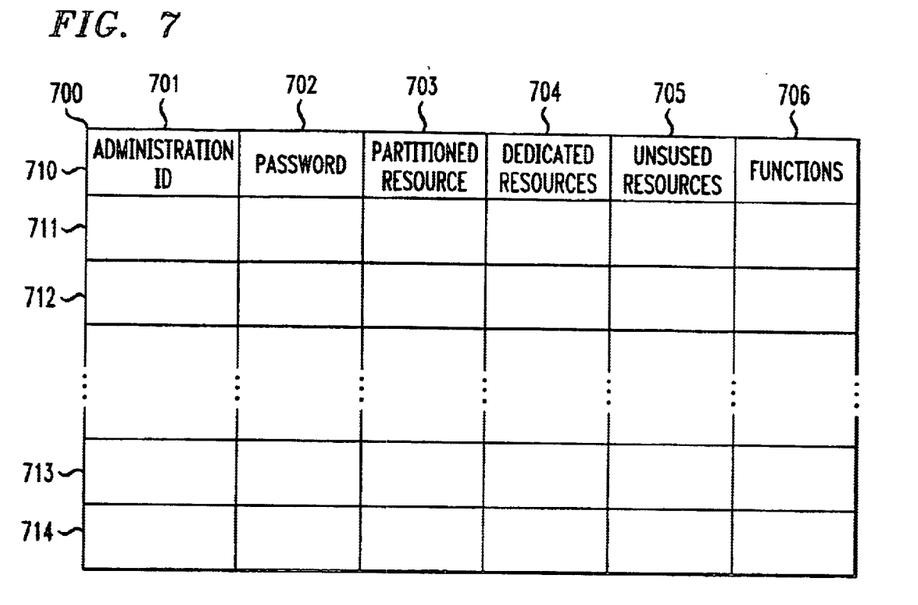
FIG. 7 illustrates a block diagram of an administrator database.
Figure 8:
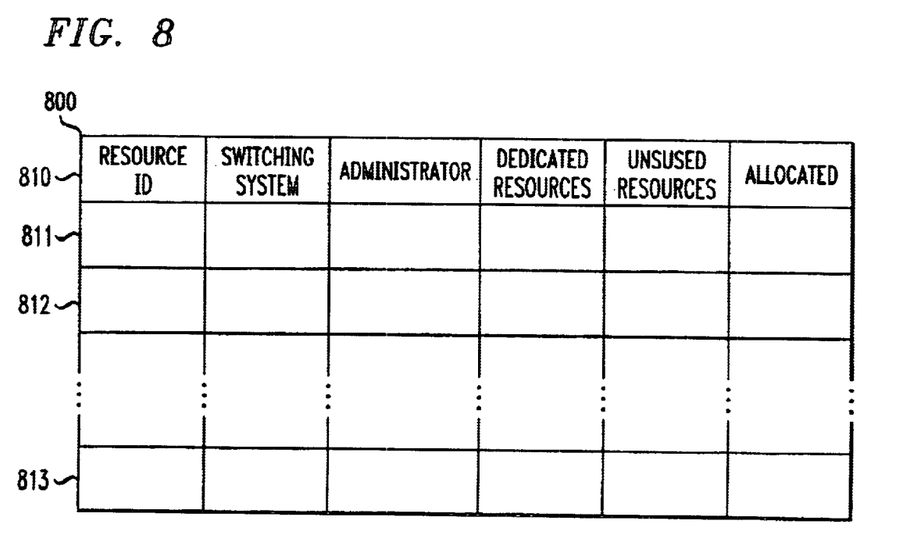
FIG. 8 illustrates a block diagram of a resource database.
Figure 9:
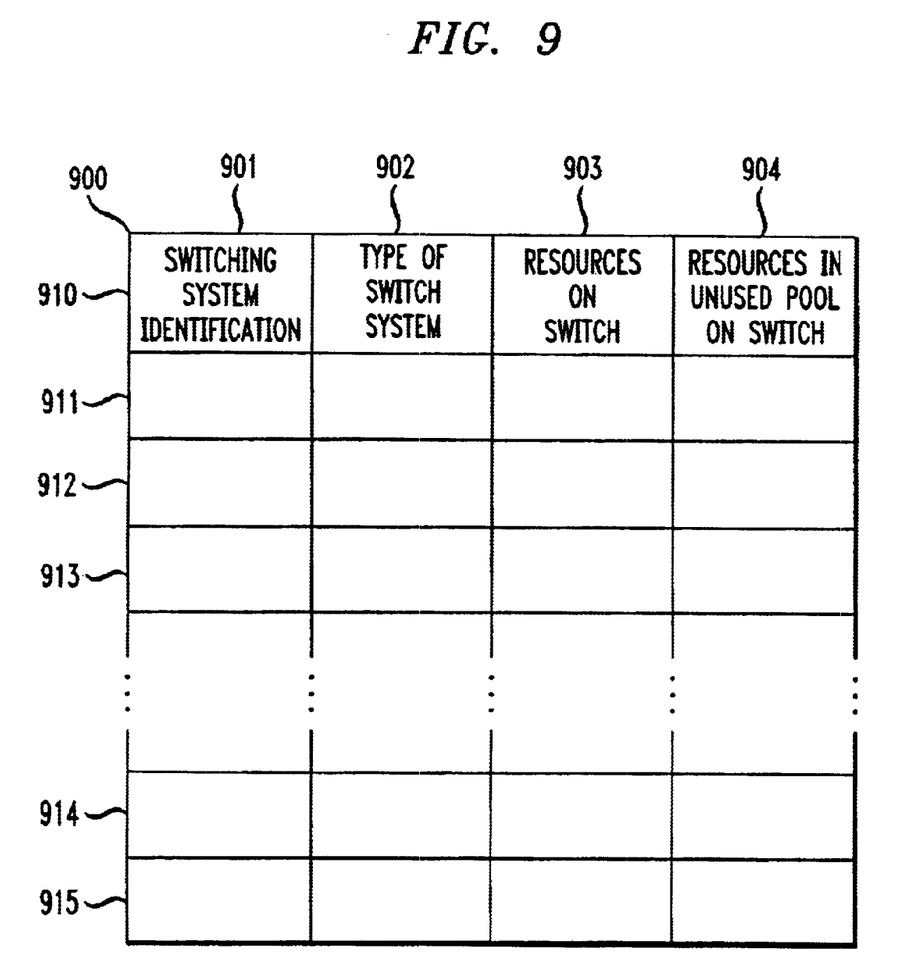
FIG. 9 illustrates a block diagram of a switching system database.

Databases Needed by Server Computer 175 to Allow Multiple Administrators to Control Switching System Resources FIG. 7–9 illustrates the databases stored in a non-volatile memory of server computer 175. These databases are accessed by software applications executed server computer 175 when commands are received from work station computers 161–164 in order to determine whether an administrator is allowed to request a command and to determine the resources partitioned to an administrator. Although the following are described as databases, one skilled in the art will recognize other types of data structures can be used to store the data in the memory of server 175.

Database for Maintaining a Record of Resources Partitioned for an Administrator—FIG. 7

Administrator database 700 is the database maintained by server computer 175 in order to determine which resources are partitioned to each administrator as well as to maintain a record of which functions an administrator is provisioned to perform on those resources. Each administrator has a corresponding data record 710–715. Each data record contains data fields 701 to 706. Data field 701 contains an administrator identification. An administrator password is stored in data field 702. The resources partitioned to the administrator are stored in data field 703. In data field 704, a list of dedicated resources is maintained and in data field 705, a list of unused resources partitioned to the administrator is maintained. A description of dedicated and unused resources is given in detail below. In data field 708, the OA&M functions that an administrator is allowed to perform is stored.

Resources Database—FIG. 8

A second database maintained by server computer 175 is resources database 800 illustrated in FIG. 8. Resources database 800 is used to maintain a record of each resource, the switching system where the resource is located, and other information about the current status of the resource. A data record 810–813 is maintained for each resource in switching systems 101–102 of telephone system 100. Each data record includes data fields 801–806. Resource data field 801 contains an identification of the resource. Switching system field 802 contains an identification of the switching system 101–102 that contains the resource. Administrator field 803 contains the administrator identification of the administrator controlling the resource. Dedicated resource field 804 indicates whether or not the resource is one of the resources dedicated to use by the administrator and unused resource data field 805 indicates whether or not the resource is in a common pool of unused resources. If the resource is in the common pool of unused resources field 706 indicates whether the resource is currently allocated to an administrator.

Switching System Database—FIG. 9

Switching System database 900 is the database that maintains a record of the resources on a switching system 101–102. This database is used to determine the proper software needed to generate a command to perform an OA&M function on a switching system 101–102 as well as to determine the resources currently available in a switching system 101–102. A separate data record 910–915 is maintained for each of the n different switching systems connected to server computer 175. Each data record contains fields 901–904. Switching system identification field 901 contains an identification of the switching system. Type field 802 is record of the type of switching system. Type field 802 is used to determine the software application needed to generate a command transmitted to switching system 101–102 to execute a requested command. Resources field 803 contains the resources on the switching system and pooled resources 804 stores a list of resources available in the common pool of unused resources.

Figure 2:
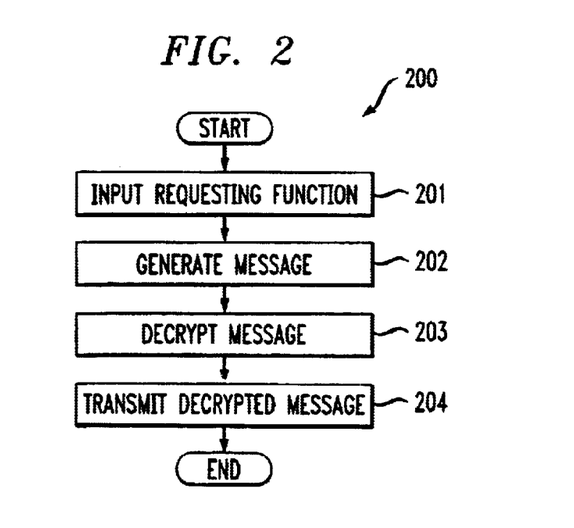
FIG. 2 illustrates a flow diagram of a process for generating commands and transmitting commands from a workstation computer to a server computer.

A Process for Receiving Commands for OA&M Functions on Resources of Switching Systems 101–102—FIG. 2

In order to allow multiple administrators control of resource in telephone system 100, each workstation 161–164 receives inputs from an administrator which represent an OA&M function to performed by controller 110 of switching system 101–102 on a resource controlled by the administrator. FIG. 2 illustrates a process for a workstation computer 161–164 to receive a command from an administrator and to transmit the command to server computer 175.

Process 200 begins in step 201 with a workstation computer 161–164 receiving an input of an OA&M command from an administrator. One manner for receiving input is for an administrator to type a command into the computer using an attached keyboard. Alternatively, the software application executed by the workstation computer to perform process 200 may include a display of commands that the administrator can select by using a mouse to move an icon to the selected command in the display and clicking on the selected command. The manner in which the input is received is left to a designer of the system.

After a command is received, a communications application executed by workstation computer 161–164 generates a message containing the command in step 202. The message is generated in the proper protocol for transmitting messages between a workstation 161–164 and server computer 175. The protocol used is dependent on the system used in communications between server computer 175 and workstations computers 161–164 and is left to the designer of the system. The message includes the identity of the administrator, the desired OA&M command, and the resources that are to be used. The message may also include an administrator identification password that ensures the message is authorized by the administrator.

In order to provide security for each administrator and for telephone system 100, the messages may be encrypted in step 203. This prevents an unauthorized user from remotely accessing server computer 175 and entering unauthorized OA&M commands. Process 200 ends in step 204 with the encrypted message being transmitted from workstations 161–164 to server computer 175. Other types of access may also be used including but not limited to verify and "call back" techniques.

Figure 3:
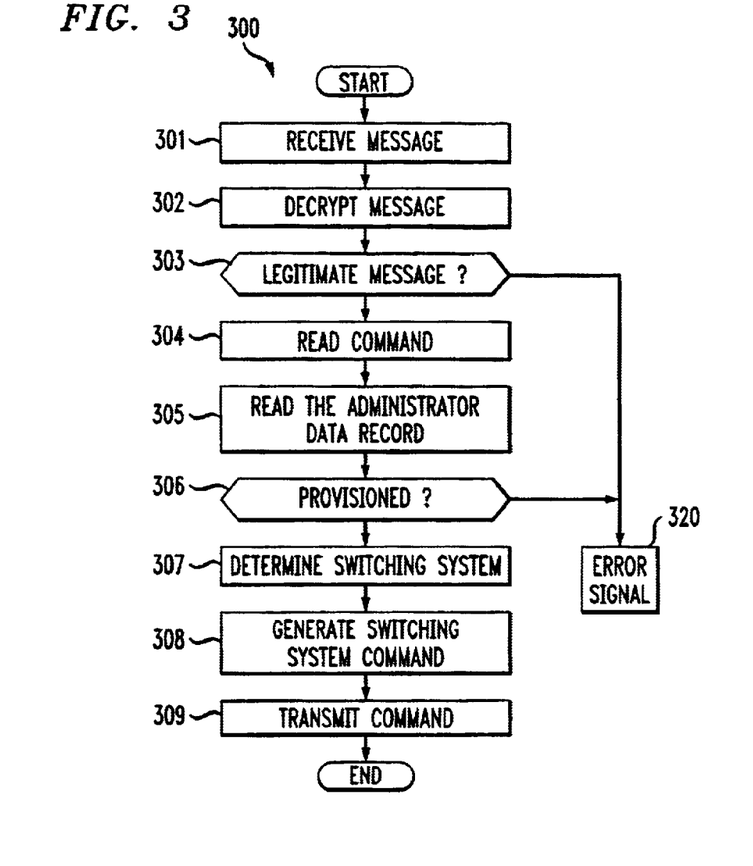
FIG. 3 illustrates a flow diagram of a process for receiving a command at a server computer and transmitting the command to the proper switching system.

Process for Receiving and Executing a OA&M Command—FIG. 3

FIG. 3 illustrates a process 300 performed by software applications executed by server computer 175 to receive and perform OA&M commands received from administrators. Process 300 begins in step 301 with server computer 175 receiving a message from a workstation computer 161–164. As stated above, it is a designers choice as to the protocol for transmitting and receiving messages between workstation computers 161–164 and server computer 175.

After receiving a message in step 301, software applications executed by server computer 175 decrypt the message in step 302. In step 303, it is determined if the message is a legitimate message. The determination is performed by a software application which reads the administrator identification and administrator password received in the message. The software application then reads the data record 710–713 of the administrator stored in administrator database 700. The password from the message and the password from field 702 of the data record read from database 700 are compared. If the passwords do not match, an error signal is generated in step 320 and process 300 ends.

If the passwords match, the message contains a legitimate command and the command is read in step 304. In step 305, the data record of administrator is read from administrator database 700. The resources that are provisioned to the administrator and the OA&M functions that the administrator may used are determined from the reading of the database record. In step 306, data field 708 is read and is used to determine if the command sent by the administrator can be performed on the administrators resources.

If the administrator attempts to perform operations on resources outside of his control or attempts to perform a function that the user is not entitled to perform, an error signal is returned in step 320 and process 300 ends. Recovery from an error situation is outside the scope of the present invention. If the administrator is performing a legitimate OA&M function, process 300 determines which switching system 101–102 contains the requested resources in step 307. Step 307 allows the system to mask which switching system 101–102 contains the requested resources. The determination in step 307 is completed by reading the data record 810–813 of resource database 800 that corresponds to the requested resource. An administrator is able to view all of the resources available to the administrator without needing to know which switching system 101–102 contains the resource.

After the switching system 101–102 that controls the resource is determined, software executed by server computer 175 generates a command recognizable by the switching system controlling the resource in step 308. This performed by reading the data record 910–913 of the switching system containing the resource. Field 902 is then read from the record to identify the type switching system that contains the resources. For each different type of switching system 101–102 in telephone network 100, a different software application generates the command for the switching system. Since software executed by server 175 generates the command to be transmitted to the switching system, an administrator can input a general command without needing to know the type of switching system that is contains the request resource. The generated command is then transmitted to controller 110 of the switching system 101102 which controls the resource in step 309. The switching system 101–102 performs the received command.

Figure 4:
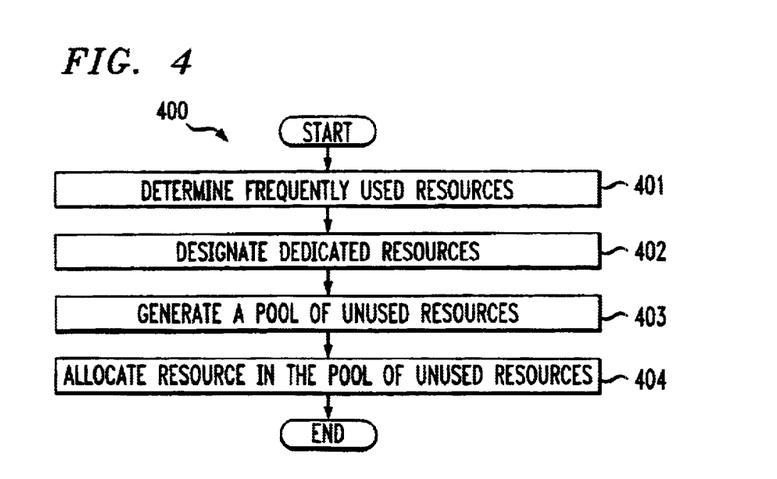
FIG. 4 illustrates a flow diagram of a process for designating resources in a partition either dedicated or unused.

Process for Pooling Excess Resources—FIG. 4

A second advantage of a system for allowing multiple administrators in telephone system 100 is the ability to create a common pool of unused resources that can be allocated to an administrator on a demand basis. FIG. 4 illustrates a process 400 for pooling unused resources in an each administrator partition and making the unused resources available to other administrators on a demand basis. This allows for more effective use of switching system resources.

Process 400 begins in step 401 by determining which resources in each administrator partition are frequently used. This can be done by monitoring the use of each resource in each partition and is left to the designer of the system. In step 402, the resources that are frequently used in each administrator partition are made dedicated resources for the partitions. This is indicated by updating field 706 of the administrator database and dedicated field 804 for each dedicated resource in resource database 800. By having dedicated resources, the administrator is ensured of having enough resources to perform normal operations when operating at a normal capacity.

In step 403, the remainder of the resources in an administrator partition are allocated to the common pool of unused resources. The allocation of unused resources to the pool of unused resources is completed in the following manner. In administrator data records 710–713 of administrator database 700, the unused resources for the each administrator are recorded. For each unused resource, unused resources field 805 in data records 810–813 are updated to indicate the resource is in the pool. For each switching system, the unused resources field 904 for each data record 910–913 is updated to indicate all of the unused resources in the switching system. The resources in the pool of unused resources are then ready to be allocated on a demand basis in step 404.

Figure 5:
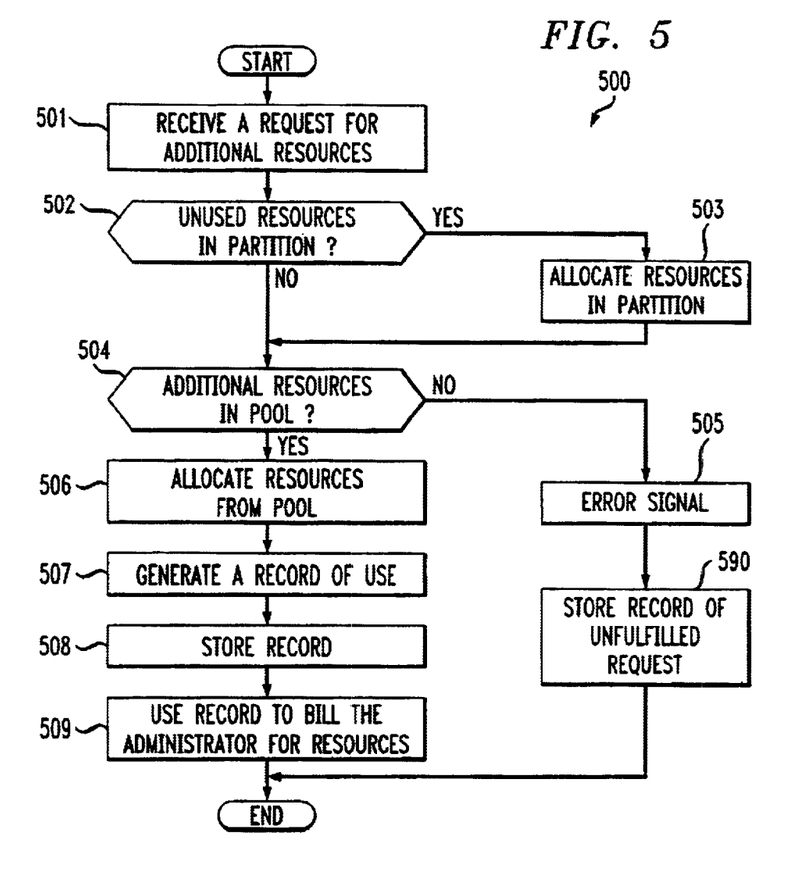
FIG. 5 illustrates a flow diagram of a process for allocating unused resources on a demand basis.

Process for Allocating Resources from the Pool of Unused Resources—FIG. 5

The advantage of pooling resources is that the unused resources can be dynamically allocated to administrators in order to meet demands of the administrators's subscribers at peak demand times. This provides more effective use and allocation of switching system resources. FIG. 5 illustrates a process 500 for allocating the pooled resources.

Process 500 begins in step 501 with server computer 175 receiving a message from a workstation computer 161–164. The message includes a request for additional resources to be allocated to an administrator. The request could be to have additional lines allocated to a telephone number to handle a larger volume of incoming telephone calls for the telephone number to correspond to a peak business time. One example of a peak business time is a time when a television commercial is being aired displaying the telephone number of a subscriber and subscriber has an increase in the number of incoming telephone calls. The administrator may want to allocate additional resources to the telephone number of the subscriber to handle the influx of telephone calls corresponding to the airing of the commercial and call interval.

In step 502, software in server computer 175 reads the data record 710–713 of the administrator and determines if the administrator partition includes unused resources that could be used to satisfy the request. If the administrator does have unused resources in the administrators partition to satisfy the request, these unused resources are allocated from the common pool of unused resources to the administrator in step 503. This assures that the resources partitioned to an administrator are always available to the administrator.

If the administrator does not have additional partitioned resources or all of the resources partitioned to the administrator are allocated from the common pool in step 503, process 500 reads a data record 910–913 in switching system database 900 of a switching system that can satisfy the administrator's request to determine whether there are resources in the common pool of unused resources available in switching system to satisfy the request. In step 504, process 500 determines if there are resources available to satisfy the demand by reading unused resource field 904. If there are not enough resources to satisfy the request, an error signal is generated in step 505.

Additionally, an optional step 590 stores a record logging unfulfilled requests. This log of unfulfilled requests can contain information such as the time of day that a request could not be fulfilled and the amount of resources that could not be allocated. This information can be used administrators or others to plan the use of resources and need for additional resources.

If there are resources available to satisfy the request in the pool, the resources are marked as currently being used in the database and allocated to the administrator in step 506. When resources are allocated, the in-use field 806 of the data record in database 800 for the resource is updated to indicate the resource is in use. Field 806 is erased when the administrator is no longer using the resource. A data record is maintained of the time and use of each resource allocated to an administrator in step 507 and is stored in a billing database to be used for billing purposes in step 508. In step 508, process 500 ends by using the data records of resource use to bill an administrator for use of the resources.

The above description describes one possible exemplary embodiment of a telephone system having multiple administrators of switching system resources. It is envisioned that one skilled in the art can and will design telephone systems having multiple administrators that infringe on the present invention as set forth in the below claims either literally or through the Doctrine of Equivalents.

What is claimed is:

1. A system for providing control of telephone switching system resources to a plurality of administrators comprising:
    means for partitioning said resources between said plurality of administrators wherein each said administrator controls a partition of said resources;
    means for receiving a request to perform an administrative function on a one of said plurality of partitions of said resources from one of said plurality of administrators;
    means responsive to receiving said request for determining said one of said plurality of administrators is provisioned to execute said administrative function on said one of said plurality of partitions; and
    means responsive to determining said one administrator is provisioned to execute said administrative function, for executing said administrative function on said one of said plurality of partitions of resources.

2. The system of claim 1 further comprising:
    means responsive to receiving said request for determining said request is from said one administrator provisioned to perform administrative functions on said partition of resources; and
    means responsive to a determination that said one administrator is not provisioned to execute said administrative function on said partition for disabling said administrative function.

3. The system of claim 2 wherein said means for determining comprises:
    means for receiving a password from said one administrator;
    means responsive to receiving said password from reading an administrator password from a storage means; and
    means responsive to reading said administrator password for comparing said administrator password and said received password.

4. The system of claim 1 wherein said system provides control of resources on a plurality of switching systems, said system further comprising:
    means for determining a one of said plurality of switching systems that includes said resources in said partition.

5. The system of claim 4 further comprising:
    means responsive to a determination of said one of said plurality of switching systems that includes said resources in said partition for generating a command for said switching system to perform said administrative function; and
    means responsive to generating said command for transmitting said command to said one switching system.

6. The system of claim 1 wherein said means for receiving said request comprises:
    a remote means for receiving an input from said one administrator;
    means in said remote means for generating a message including request responsive to receiving said input;
    server means;
    means for transmitting said message from said remote means to said server means.

7. The system of claim 6 further comprising:
    means responsive to generating said message for encrypting said message in said remote means; and
    means in said server means for decrypting said message responsive to receiving said message.

8. The system of claim 6 further comprising:

means in said server means for generating a command to perform said administrative function in said request; and means for transmitting said command to said switching system.

9. The system of claim 1 further comprising:

means for determining which said resources in each said partition are unused frequently; and means responsive to said determination for generating a common pool of unused resources from said resources that are frequently unused.

10. The system of claim 9 further comprising:

means for allocating resources in said common pool of unused resources to an administrator.

11. The system of claim 10 further comprising:

means for receiving a request for additional resources from an administrator;

means responsive to receiving said request for determining which resources in said common pool can be allocated to said administrator; and means responsive to a determination of which said resources in said common pool are available for allocating said resources from said common pool to said administrator.

12. The system of claim 11 wherein said means for determining which resources can be allocated to said administrator comprises:

means responsive to receiving said request for allocating said resources of said administrator in said pool to said administrator; and means for determining said pool has resources from other administrators to provide to said administrator to satisfy said request.

13. The system of claim 11 further comprising:

means for determining said request cannot be fulfilled from said pool of unused resources; and means responsive to a determination that said request cannot be fulfilled for storing a record of said unfulfilled request.

14. The system of claim 9 further comprising:

means for dedicating frequently used resources in each said partition to said administrator of said partition.

15. A system for allowing a plurality of administrators to control resources on a switching system via a server computer communicatively connected to a controller in said switching system comprising:

instructions for directing said server computer to receive a request from one of said plurality of administrators for an administrative function to be performed on said resources controlled by said administrator, to read an administrator database, to determine whether said administrator is provisioned to execute said requested administrative function, to generate a command in a format understandable by said controller of said switching system wherein said command directs said controller to perform said administrative function, and to transmit said command to said controller responsive to a determination that said administrator is provisioned to execute said function; and a memory readable by said server computer for storing said instructions.

16. The system of claim 15 wherein each said request includes an administrator identification and a password wherein said instructions further comprise:

instructions for directing said server computer to read an administrator record in said administrator database to determine if said password in said request is equal to a password stored in said administrator record and to disable said request responsive to a determination said passwords are not equal.

17. The system of claim 15 wherein said server computer is communicatively connected to a plurality of switching system controllers and said instructions further comprise:

instructions directing said server computer to determine which one of a plurality of switching system contains said resource to determine a proper protocol for said commands based upon which said one of said switching system is to receive said command, and to generate said command to perform said functions in said proper protocol responsive to said switching system containing said resource.

18. The system of claim 15 wherein said server computer is communicatively connected to a plurality of remote work station computers said instructions further comprising:

instructions for directing said server computer to receive said request from one of said plurality of work stations in a message.

19. The system of claim 18 wherein said work station executes software that encrypts said message, said instructions for receiving said message in said server further comprise:

instructions for decrypting said message.

20. The system of claim 15 wherein said instructions further comprise:

instructions to direct said server computer to determine which resources partitioned to an administrator are frequently left unused by said administrator, to maintain a resource database for storing a data record for each of said resources that indicates a resource is dedicated or unused, to update said resource database to indicate said frequently unused resources are in a common pool of unused resources.

21. The system of claim 20 wherein said instructions further comprise:

instructions for directing said said server computer to allocate resources from said common pool of unused resources to an administrator responsive to said administrator needing excess resources to meet demands.

22. The system of claim 21 wherein said instructions to allocate resources comprise:

instructions for directing said server computer to receive a request from an administrator, to allocate said unused resources of said administrator in said common pool of unused resources to said administrator and to allocate any extra needed resources from said unused resources of other administrators in said pool of unused resources.

23. The system of claim 21 wherein said instructions to allocate said resources further comprise:

instructions directing said server computer to maintain a log containing each unfulfilled request for additional resources.

24. A method for allowing a plurality of administrators to control switching system resources in a telephone system comprising the steps of:

partitioning said resources between said plurality of administrators wherein each said administrator controls a partition of resources;

receiving a request to perform an administrative function on a partition of said resources from one of said plurality of administrators;

determining said one of said plurality of administrators is provisioned to execute said administrative function on said partition responsive to receiving said request; and executing said administrative function on said partition of resources responsive to determining said one administrator is provisioned to execute said administrative function.

25. The method of claim 24 further comprising the steps of:

determining said request is from said one administrator provisioned to perform administrative functions on said partition of resources responsive to receiving said request; and disabling said administrative function responsive to a determination that said one administrator is not provisioned to execute said administrative function on said partition.

26. The method of claim 24 wherein said step for determining comprises the steps of:

receiving a password from said one administrator;

reading a administrator password from a database responsive to receiving said password; and comparing said administrator password and said received password.

27. The method of claim 24 wherein said telephone system has resources on a plurality of switching systems, said method further comprising the steps of:

determining a one of said plurality of switching systems which includes said resources in said partition.

28. The method of claim 27 further comprising the steps of:

generating a command for said one of said plurality of switching systems to perform said administrative function on said resources in said partition responsive to a determination of which said one of said plurality of switching systems includes said resources ; and transmitting said command to said one of said plurality of switching systems responsive to generating said command.

29. The method of claim 24 wherein said step for receiving said request comprises the steps of:

receiving an input of a request from said one administrator at a workstation that is remote from said server;

generating a message at said workstation including said request responsive to receiving said input; and transmitting said message to said server.

30. The method of claim 29 further comprising the steps of:

encrypting said message in said workstation responsive to generating said message; and decrypting said message at said server responsive to receiving said message.

31. The method of claim 29 further comprising the steps of:

generating a command to perform said administrative function in said request responsive to receiving said message in said server computer; and transmitting said command from said server computer to said switching system.

32. The method of claim 24 further comprising the steps of:

determining which said resources in each said partition are unused frequently; and generating a common pool of unused resources from said resources that are frequently unused.

33. The method of claim 32 further comprising the step of:

allocating resources in said common pool of unused resources to an administrator.

34. The method of claim 33 said step of allocating comprises the steps of:

receiving a request for additional resources from an administrator; and determining which resources in said common pool to allocate to said administrator responsive to receiving said request.

35. The method of claim 34 wherein said step for determining which resources can be allocated to said administrator comprises the steps of:

allocating said resources of said administrator in said common pool to said administrator responsive to receiving said request from said administrator;

determining said pool has enough resources from other administrators to provide to said administrator to satisfy said request; and allocating resources of said other administrators in said common pool to said administrator.

36. The method of claim 35 further comprising the step of:

recording a record of an unfulfilled request responsive to a determination that there are not enough resources to satisfy to said request.

37. The method of claim 32 further comprising the step of:

dedicating frequently used resources in each of plurality of said partitions to said administrator of each partition.

* * * * *